Feb. 5, 1963   H. K. SEIKE   3,076,922
VOLTAGE REGULATOR FOR GENERATORS
Filed April 18, 1960   2 Sheets-Sheet 1

LOW BATTERY OUTPUT;
HEAVY GENERATOR LOAD

AVERAGE BATTERY OUTPUT;
AVERAGE GENERATOR LOAD

HIGH BATTERY OUTPUT;
LIGHT GENERATOR LOAD

Figure 2:
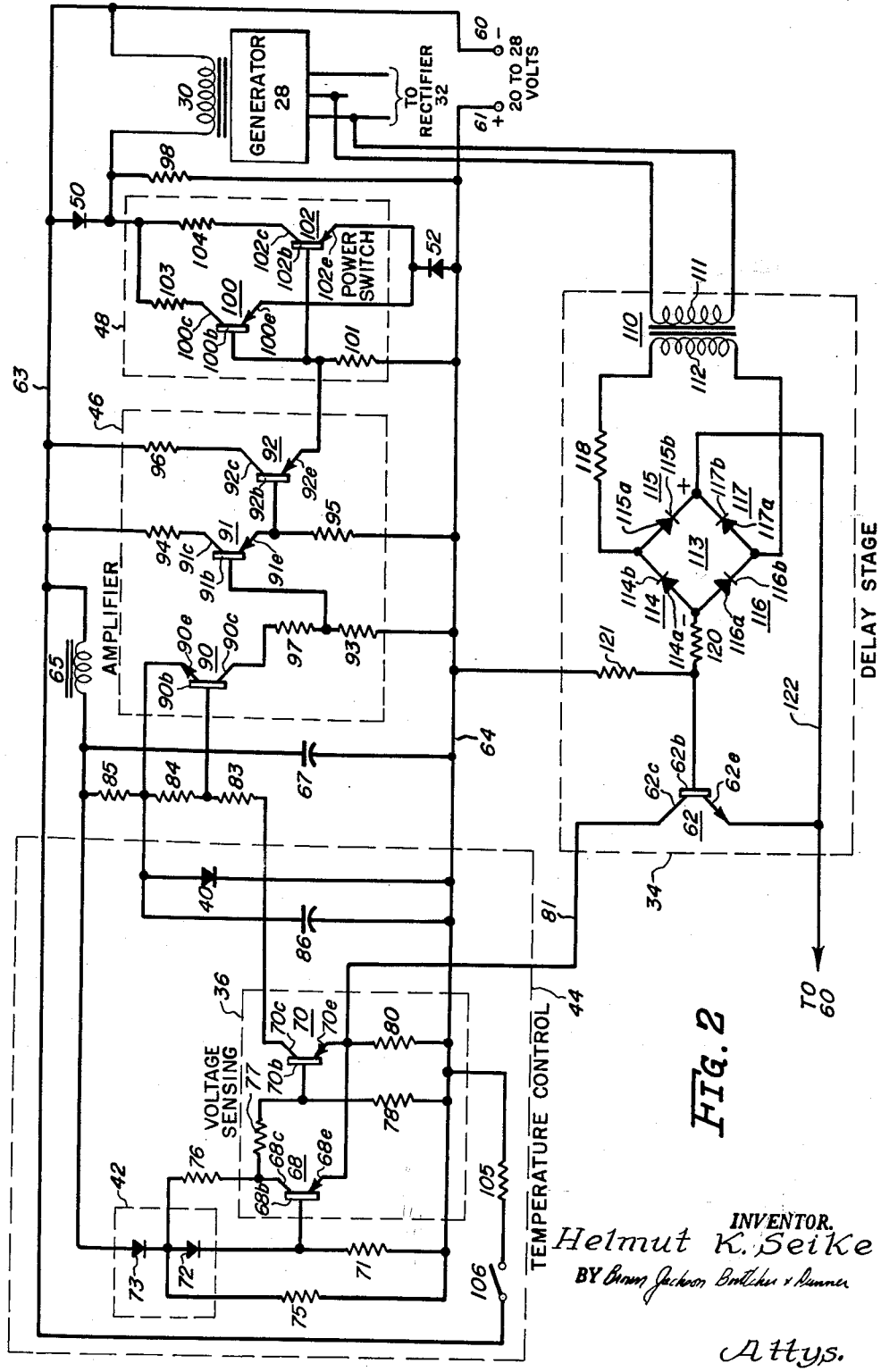

WAVEFORMS OF COLLECTOR-EMITTER
VOLTAGE ACROSS POWER TRANSISTORS
100 AND 102 (FIG. 2)

INVENTOR.
Helmut K. Seike
BY
Attys.

Feb. 5, 1963

H. K. SEIKE 3,076,922

VOLTAGE REGULATOR FOR GENERATORS

Filed April 18, 1960

2 Sheets-Sheet 2

INVENTOR.
*Helmut K. Seike*
BY *Brown, Jackson, Boettcher & Dienner*

*Attys.*

United States Patent Office 3,076,922
Patented Feb. 5, 1963

3,076,922
VOLTAGE REGULATOR FOR GENERATORS
Helmut K. Seike, Toledo, Ohio, assignor to Kaiser Industries Corporation, Oakland, Calif., a corporation of Nevada
Filed Apr. 18, 1960, Ser. No. 22,840
15 Claims. (Cl. 322—28)

This invention is directed to voltage regulators and more particularly to a transistorized regulator system which senses the voltage level of a direct-current (D.C.) source and provides a supplemental voltage for boosting or supplementing the source voltage, thereby furnishing an output potential which remains constant notwithstanding variations of the source voltage.

There has long been a need for reliable, portable and light-weight power supplies which provide a precise output potential for use, by way of example, in certain automotive or other types of mobile vehicles, to afford precision operation of electrical equipment carried by the vehicle.

With the advent of economical, small and highly reliable transistorized converter systems such as that described and claimed in applicant's copending application entitled "Static Constant Voltage D.C. to D.C. Converter," filed January 28, 1960, having Serial No. 5,184, and assigned to the assignee of the present invention, the utility of such a well regulated power supply as is provided with the present invention is even more apparent. The converter shown in the above-entitled copending application is an extremely sensitive structure which provides a constant output potential, automatically compensating for variations in the load voltage and additionally in the source potential. To preclude such additional regulation within the converter occasioned by changes in the source or battery potential thereof, the present invention provides a constant D.C. voltage level for operation of such equipment.

Prior art attempts to regulate the power supply in such vehicles have included the connection of a variable resistor, such as a carbon pile resistor, in series with the field coil of the generator operated by the vehicle's engine. A solenoid having a plunger actuator to compress or permit expansion of the carbon pile resistor has its winding connected to sense the output of the power supply. In this way the output voltage of the generator can be varied to compensate, to some degree, for fluctuations in the output power level of the system. Of course, the accuracy of such a system is not very high, nor does the accuracy remain constant over a large temperature range. Because of the alternate compression and expansion of the carbon pile resistor, such units are subject to aging and wearing out due to contact arcing. These disadvantages render such carbon pile type arrangements unsuitable where a very high and uniform degree of regulation of the power supply is required.

To provide a well-regulated supply voltage (for example, of the commonly used 28 volt level), the generator field coil (which is normally not center tapped) could have one end thereof connected to the collector or output electrode of each of a pair of power transistors. Such power transistors can then be controlled or rendered alternately conductive by means of a square wave train of signals applied with opposite polarities to the bases or control electrodes of the power transistors. Accordingly the power transistors are alternatively conductive to pass a continuous current through the generator field winding, thus providing the highest possible field energy. The wave train can be generated and passed through a preamplifier arrangement, which can be turned on or off whenever the level of the supply voltage indicates that relay contacts should be closed or opened to effect a regulating function. This switching on and off can be done at a frequency lower than the frequency of the wave train; thus, when the battery voltage falls, the preamplifier is switched on to pass a train of pulses to the bases of the power transistors.

More specifically, a voltage sensitive relay could be used to sense when the vehicle battery provides sufficient voltage to meet the regulation requirements. When the battery voltage is high, there is no output required from the supplemental voltage supply, or converter device, and the relay serves to turn on the preamplifier to pass a train of pulses only when the battery voltage falls. The advantages of simplicity inherent in this system are offset by the production of electrical interference and aging of the relay contacts caused by the repeated opening and closing thereof, and the extent of the error signal deviation required to operate even a very sensitive relay. Obviously the requisite error signal is larger, and the operating time of the relay is slower, than would be the case in a transistorized circuit utilized to effect control of the converter or other supplemental power supply.

It is an object of the invention to provide a voltage regulator in which an extremely sensitive transistorized control system, which has no moving parts and thus does not produce any radio interference due to contact closure and opening, is utilized to sense the deviation of the vehicle supply voltage from a predetermined level, where the supply voltage includes a battery voltage as supplemented by a rectified potential adjusted by the control system.

It is another object of the invention to provide such a voltage regulator which finds utility in a vehicle, connected so the control system senses deviation of the supply voltage for the vehicle from a predetermined level and regulates the excitation level of the vehicle generator to provide a variable supplemental voltage for aiding the potential of the vehicle battery, thereby to provide a well regulated supply potential.

A voltage regulator system constructed in accordance with the inventive teaching provides a regulated output voltage as a result of augmenting a battery supply potential by a supplemental potential. A control system is provided which senses the deviation of the instantaneous voltage at the output terminals from the desired regulated potential which should appear thereat. In a preferred embodiment of the invention, the control system furnishes a signal indicative of the deviation from the desired output voltage level to vary the energization of the field coil of a vehicle generator, thus to vary the generator output voltage which regulates the boosting of the potential of the vehicle battery to provide the regulated output potential.

Figure 1:
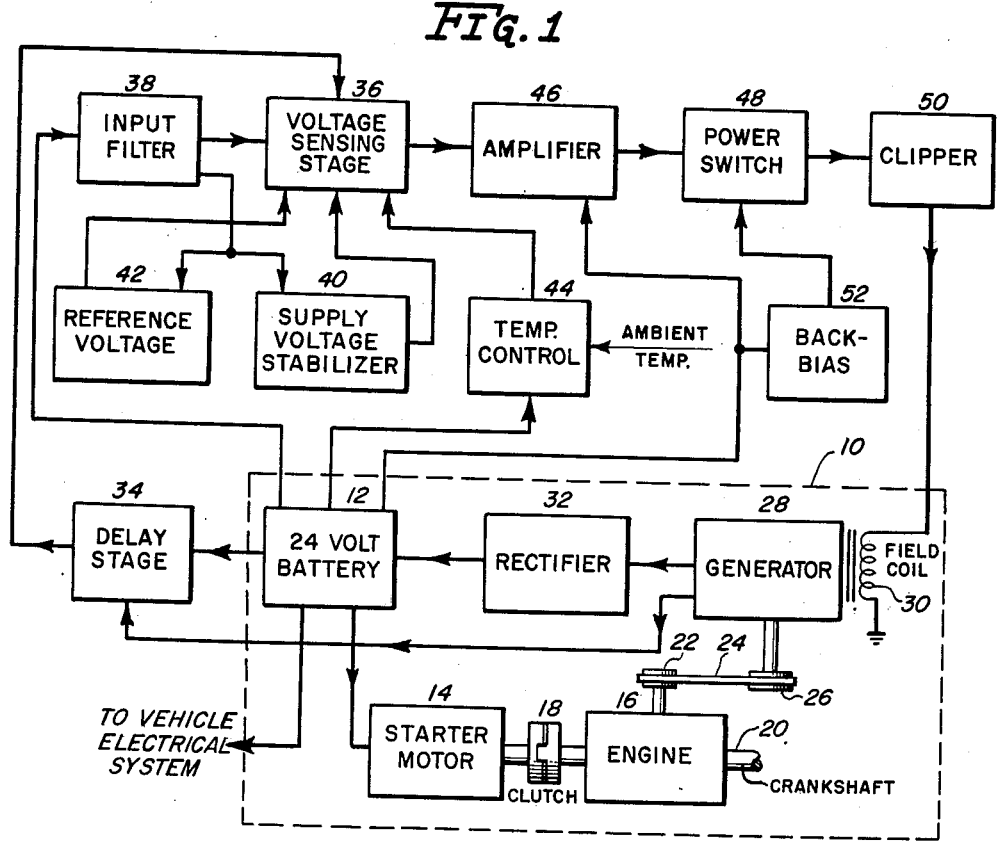
Figure 1:
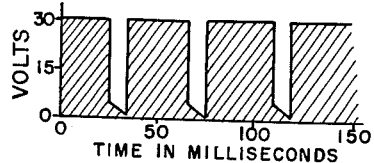
Figure 1:
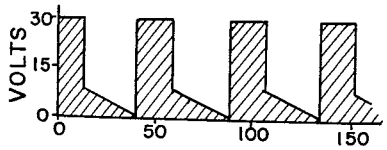
Figure 1:
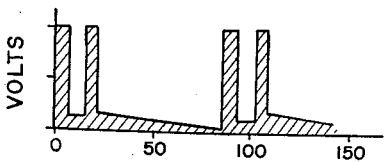

The features of the present invention which are believed to be novel are set forth with particularity in the appended claims. The invention itself, together with further objects and advantages thereof, may best be understood by reference to the following description taken in connection with the accompanying drawings, in the several figures of which like reference numerals identify like elements, and in which:

FIGURE 1 is a block diagram illustrating a preferred embodiment of the invention;
FIGURE 2 is a schematic diagram depicting the specific circuitry of certain components of the invention shown in block form in FIGURE 1; and
FIGURES 3A, 3B and 3C are graphical representations useful in understanding the operation of the embodiment of the invention shown in FIGURES 1 and 2.

*General Description*

The elements of a preferred embodiment of the inventive control system are indicated in block form in FIGURE 1, together with the connections of such system to conventional automotive apparatus depicted within broken line rectangle 10. As there shown the conventional equipment includes a 24-volt battery 12 connected to energize a starter motor 14 and to supply power for the vehicle's electrical system. The vehicle engine 16 is positioned to be driven by a clutch 18 and starter motor 14. When energized, engine 16 drives crank shaft 20 and also rotates a drive pulley 22, which rotates belt 24 and thus rotates driven pulley 26 to supply mechanical power to generator 28. Because of the increased efficiency obtainable at high power levels, a three-phase generator is used. The output level of generator 28 is varied as the amount of energy coupled to field coil 30 of the generator is varied. When energized, generator 28 supplies alternating current (A.C.) power to a rectifier 32, which converts such energy to D.C. power. Rectifier 32 may be parallel-connected with battery 12 to augment or boost the voltage appearing at the battery terminals.

In accordance with one aspect of the invention, the novel control system includes a delay stage 34 to which an energizing potential from battery 12 and an operating signal from generator 28 are applied. When generator 28 produces only a low output voltage, below the level of the operating signal, delay stage 34 furnishes a disabling signal to voltage sensing stage 36 which maintains the control system inoperative. As engine 16 reaches idling speed, the requisite operating signal is applied to delay stage 34 to cut off transistor 62 (FIGURE 2) and the disabling signal is removed, thus conditioning voltage sensing stage 36 (and the entire system) for operation. The energizing potential of battery 12 is coupled over an input filter 38 to voltage sensing stage 36. A supply voltage stabilizer 40 and a reference voltage stage 42 are also coupled between input filter 38 and voltage sensing stage 36. As will be made clear hereinafter, stabilizer 40 provides a constant operating voltage for voltage sensing stage 36. A temperature control unit 44 energized by battery 12 senses the ambient temperature, and regulates the temperature of the components in voltage sensing stage 36 and in certain other elements of the inventive control circuit. The voltage sensing circuit need be temperature controlled only for quick starts at very low ambient temperatures; otherwise the circuit is operable without the temperature control unit or oven.

The output side of voltage sensing stage 36 is coupled through an amplifier stage 46, a power switch 48, and a clipper stage 50 to field coil 30 of the generator. The output signal from voltage sensing stage 36 is thus amplified and applied to field coil 30 to regulate the energization of generator 28. Amplifier 46 is energized from battery 12, as is a back bias unit 52 for power switch 48. Although shown as separate stages in the simplified diagram of FIGURE 1, supply voltage stabilizer 40, clipper 50, and back bias stage 52 may be simple Zener diodes or rectifier units. The general circuitry and the cooperation between stages will now be described in connection with FIGURE 2.

With reference to FIGURE 2, terminals 60 and 61 represent the supply terminals to which equipment in the mobile unit is connected. A 28 volt potential may be provided to energize the electrical equipment of the vehicle by the parallel connection of battery 12 and the output circuit of rectifier 32, as explained in connection with the simplified showing of FIGURE 1. The apparatus of the preferred embodiment shown in FIGURE 2 is connected to operate in such manner that, when the desired 28 volt potential is present at terminals 60 and 61, the potential appearing at the base of first transistor 68 in voltage sensing stage 36 is sufficient to maintain this stage conductive, which causes the second stage of the Schmitt type bistable voltage sensing arrangement to be maintained non-conductive. The various amplifier and power switching transistors are also maintained non-conductive, so long as the second voltage sensing transistor 70 is biased to cutoff.

Delay stage 34 prevents the second transistor stage 70 from operating, even if transistor 68 should be cut off, if the A.C. output voltage of the generator is too low. When the engine is at cranking speed, there is little output voltage from generator 28, and only a small signal is translated across coupling transformer 110 and rectified in bridge 113 to provide a negative or back-bias potential at base 62b of transistor switch 62. Accordingly the forward bias normally provided by the emitter and base connections of this stage causes a collector current to flow from transistor 62 over common emitter resistor 80 in voltage sensing stage 34. This current flow causes a voltage drop across common emitter resistor 80 which provides sufficient back-bias for stage 70 to maintain this stage, and the power boosting system, turned off irrespective of the state of transistor 68.

A resistor 98, series-connected with field coil 30 between supply conductors 63 and 64, provides a small, steady current through the field coil to energize generator 28 at a low level. However, such level is insufficient to provide a signal across transformer 110 sufficient to develop an output potential or operating signal from rectifier bridge 113 of a level sufficient to cut off transistor switch 62. The control effect of the output potential from generator 28 coupled over transformer 110 and rectified in bridge 113 is determined by the turns ratio in transformer 110 and by the steady state field current through resistor 98 and field coil 30 when the engine is only idling. In a preferred embodiment, such turns ratio and resistance value were set so that, when engine 16 is cranked by starter motor 14 over a driving connection from clutch 18, the voltage output from generator 28 does not produce a negative voltage of sufficient level to cut off transistor 62. These values were adjusted so that, when the engine reached idling speed, the generator output produced a D.C. control voltage at the output terminals of rectifier bridge 113 sufficient to cut off transistor 62 and remove the back-bias from common emitter resistor 80 caused by flow of collector current from transistor 62, so that when transistor 68 is subsequently cut off, such operation is effective to immediately turn on transistor 70 and the remaining transistors in the control system. The inclusion of resistor 118 in the secondary circuit of transformer 110 limits the secondary current to a safe value as the engine speed increases farther. Manifestly, if resistor 118 is a non-linear unit such as a thermistor, temperature influences on the threshold operating level of transistor switch 62 can be compensated.

The switching time of transistor 62 is very fast, in the order of a few microseconds. Accordingly, as soon as the engine approaches idling speed, a sufficient output potential appears across rectifier bridge 113 and transistor switch 62 is cut off, so that a lower supply potential at terminals 62 and 61 is effective to cut off transistor 68 and turn on transistors 70, 90—92, and 100 and 102. Thus the field coil 30 is fully energized to raise the output level of generator 28, which is rectified in rectifier 32 and used to supplement or augment the output of battery 12 to increase the load voltage. This increase is immediately sensed at terminals 60 and 61 as applied over Zener diodes 73 and 72 to base 68b of transistor 68. Thus the satisfaction of the regulation requirements is immediately sensed and the control system is turned off as the desired potential (i.e., 28 volts) is reached. As will be made clear in connection with FIGURE 3, the system is thus cycled on and off during brief periods, and both the on time (or duty cycle) of the system and the duration between successive conductive periods (or frequency) are functions of the difference in the actual potential at terminals 60 and 61 due to the load conditions and the desired output potential. Because both duty cycle and frequency are varied, the regulation quality is assured for different engine speeds which would otherwise cause considerable voltage changes because of the nature of the generator. The rapid cycling of the system to regulate the potential at terminals 60 and 61 provides what is, for practical purposes, a constant and well regulated potential at these terminals. The specific system of FIGURE 2 will now be described.

*Circuit Description—FIGURE 2*

Control system 34—52 is energized over a negative conductor 63 and a positive conductor 64 which are connected to input terminals 60 and 61, respectively. An input filter, shown as block 38 in FIGURE 1, is connected between conductors 63 and 64 and voltage sensing stage 36, and includes an input impedance element shown as an inductance 65, which may be replaced by a resistor, connected between terminal 60 and reference voltage stage 42, and a capacitor 67 connected between supply conductors 63 and 64. This filter protects the control system against any malfunction which might otherwise be caused by the high ripple component and "spikes" or sharp pulses which appear in the voltage at terminals 60 and 61. This size of the filter components affects the ripple. If inductance 65 includes a high value of resistance, and if capacitor 67 is also large, this large RC time constant will produce a high amplitude ripple of low frequency. Conversely, a low RC time constant produces a low amplitude ripple of high frequency.

Voltage sensing stage 36 comprises a pair of transistors 68 and 70, and is energized over negative and positive conductors 63 and 64, respectively.

Transistor 68 is of the PNP type and includes an emitter 68e, a base 68b, and a collector 68c. Because this transistor is connected in a common-emitter configuration, emitter 68e is the common electrode, base 68b is the input electrode, and collector 68c is the output electrode. In like fashion transistor 70 is also of the PNP type and includes an emitter 70e, a base 70b, and a collector 70c. Bias potential for base 68b of input transistor 68 is provided by a voltage divider arrangement including resistor 71 and Zener diodes 72 and 73, series-connected between positive conductor 64 and negative conductor 63. Another resistor 75 is parallel-connected with resistor 71 and diode 72.

Collector 68c is connected over resistor 76 and diode 73 to negative conductor 63; diode 73 reduces the supply potential appearing on conductor 63 to a safe value for collector 68c. The junction of resistor 76 and collector 68c is coupled over series-connected resistors 77 and 78 to conductor 64 to provide bias potential for base 70b of transistor 70; base 70b is connected to the junction of resistors 77 and 78. Resistor 80 is connected as the common emitter resistor for emitters 68e and 70e of transistors 68 and 70. Collector 70c of transistor 70 is coupled over resistors 83, 84 and 85 to negative conductor 63.

As mentioned hereinbefore, transistors 68 and 70 are connected in a Schmitt-type bistable trigger circuit. The bias potential appearing across resistor 71 in the base-emitter circuit of transistor 68 is established by voltage divider arrangement 71—73, with the principal portion of the potential supplied at terminals 60 and 61 appearing across Zener diodes 72 and 73. The remainder of the potential appears across resistor 71, and when the potential at terminals 60 and 61 is 28 volts, the bias potential appearing across resistor 71 is sufficient to maintain transistor 68 conducting. The collector current of this stage flows through resistor 76, causing a voltage drop thereacross which reduces the forward bias appearing across resistor 78 in the base-emitter circuit of transistor 70; the voltage drop across common emitter resistor 80 provides a back bias for transistor 70, thus maintaining this transistor non-conductive. When the potential at terminals 60 and 61 is decreased sufficiently, the forward bias for transistor 68 is decreased by the amount required to cut off this transistor. as transistor 68 is cut off, the back-bias for transistor 70 formerly contributed by current flow from transistor 68 through common emitter resistor 80 is removed. As transistor 68 ceases conduction, the voltage drop across resistor 76 is likewise decreased, the potential changes in this voltage divider arrangement (73, 76, 77, 78) providing a forward bias in the emitter-base circuit of transistor 70; if transistor switch 62 has been cut off, this forward bias is sufficient to cause transistor 70 to conduct. The switching action between the conductive and non-conductive conditions of these two transistors is well known and understood in the art.

The switching of transistors 68 and 70 between the conductive and non-conductive states is facilitated, and thus the sensitivity of the inventive control system is further increased, because Zener diode 73 is connected in the voltage-divider arrangement (73, 76, 77 and 78) to which base 70b of the second transistor is connected. Whereas the terminal voltage at terminals 60 and 61 may be 28 volts, a negative potential across resistor 71 of, for example, only 2 volts is sufficient to cause transistor 68 to conduct and a potential difference of, for example, 0.3 volt is sufficient to effect non-conduction of transistor 68. Manifestly if a simple resistive voltage divider were connected between supply conductors 63 and 64 to pass terminal voltage fluctuations to the input circuit of transistor 68, only a small voltage fluctuation, insufficient to effect the desired switching, would appear in the input circuit of the voltage sensing stage. However, with the utilization of Zener diodes 72 and 73, series-connected with resistor 71 so that a current sufficient to maintain their operation well within the Zener or constant voltage region flows through these diodes, a constant potential drop appears across diodes 72 and 73. Accordingly substantially all of the voltage fluctuations appearing at terminals 60 and 61 are transferred to base 68b of transistor 68, and, because diode 73 is also in the voltage divider circuit to which base 70b of second switching transistor 70 is connected, a similar action is effected for this transistor. Thus voltage sensing stage 36 exhibits a very high sensitivity (in practice a few hundred millivolts) by reason of the utilization of constant-potential Zener diodes to transfer nearly all of the terminal voltage fluctuations to the error-sensing portion of the control system.

A supply voltage stabilizing Zener diode 40 is connected between positive conductor 64 and a point in the voltage-divider network which supplies operating potential for collector 70c of transistor 70, and a capacitor 86 is parallel-coupled with diode 40 to protect the diode against overvoltage "spikes" or pulses. Thus the second transistor is also operated from a stable voltage, and Zener diode 40 also serves to drop the supply potential for the first transistor of amplifier 46 to a desired level.

Amplifier 46 includes an NPN type transistor 90 and a pair of PNP type transistors 91 and 92. Transistors 91 and 92 are connected in an emitter-follower configuration to provide a low-impedance driver source for power switching stage 48. First transistor 90 of the amplifier is an NPN type to facilitate switching the amplifier on responsive to conduction of second transistor 70 in the voltage sensing stage.

Specifically, transistor 90 includes an emitter 90e connected to the junction of resistors 84 and 85, and a base 90b connected to the junction of resistors 83 and 84 in the voltage-dropping arrangement connected between collector 70c of transistor 70 and negative conductor 63. Collector 90c is connected over resistors 97 and 93 to positive conductor 64, and the junction of resistrs 97 and 93 is connected to base 91b of transistor 91.

Collector 91c of transistor 91 is connected over a resistor 94 to negative conductor 63. Emitter 91e of transistor 91 is connected both to base 92b of transistor 92, and over a resistor 95 to positive conductor 64. Collector 92c of transistor 92 is connected over a resistor 96 to negative conductor 63, and emitter 92e is connected both to base 100b of transistor 100 in power switch 48, and also over resistor 101 to positive conductor 64.

If the generator output is sufficient so that transistor switch 62 is cut off, the back-bias on resistor 80 caused by collector current from 62c is removed and the system is ready for operation. In the inoperative condition of the control system (i.e., with a full 28 volt potential at terminals 60 and 61), transistor 68 is conducting and transistor 70 is cut off in voltage sensing stage 36, transistors 90—92 in amplifier section 46 are cut off, and transistors 100 and 102 in power switch 48 are also cut off. As the voltage at supply terminals 60 and 61 decreases from 28 volts, transistor 68 is cut off and transistor 70 becomes conductive, as explained above. Collector current from transistor 70 flows through resistors 83, 84 and 85; the potential at base 90b of transistor 90 goes more positive and this transistor is switched on. Accordingly the collector current flowing through resistors 97 and 93 causes the potential at base 91b of transistor 91 to go more negative, turning on transistor 91 and effecting current flow through emitter resistor 95 of this stage. Such current flow also causes a more negative potential to appear at base 92b of transistor 92 which is also immediately rendered conductive, and current flows through emitter resistor 101, transistor 92, and collector resistor 96 of this stage.

Power switching stage 48 includes a second transistor 102 parallel-connected with first transistor 100. Emitters 100e and 102e of these two stages are coupled together, and over a power diode 52 to positive conductor 64. Diode 52 may be of the silicon junction type and is connected to provide back bias for the power switching stage when it is non-conductive, because such a diode does not conduct until about 0.5 volt is applied thereacross. Collector 100c of transistor 100 is connected over a dropping resistor 103 to a common point, and collector 102c of transistor 102 is connected over resistor 104 to such common point; field coil 30 of generator 28 is coupled between such common point and negative conductor 63. Use of separate resistors 103 and 104, and adjustment of their individual resistance values, enables transistors 100 and 102 to share equal portions of the load current. A de-spiking diode 50 is parallel-connected with field coil 30 to protect power switching transistors 100 and 102 against voltage pulses or "spikes" developed across coil 30 as the current therein is rapidly cut off.

When transistor 92 becomes conductive, its emitter current flows through resistor 101 and causes the potential at bases 100b and 102b of transistors 100 and 102 to go more negative, causing these transistors to conduct, thus translating power through field coil 30 and increasing the output of generator 28. Three separate conductors are shown at the output side of the generator because a three phase A.C. generating system may be used to provide a high power output with greater efficiency than is attained in a single phase system; rectifier 32 is connected to rectify this A.C. power to produce D.C. power for augmenting the D.C. battery voltage.

Temperature control unit 44 is shown encompassing voltage sensing stage 36 including Zener diodes 72 and 73, and a heating resistor 105 which is series-connected with a bimetallic or thermostatic switch 106. Elements 105 and 106 are connected between positive conductor 64 and negative conductor 63. As the temperature within unit or oven 44 falls below a preset level, thermostatic switch 106 is closed through deflection of the bimetallic element in a well known manner and current flows through resistor 105 to raise the temperature within the space. As the temperature reaches the desired level, thermostatic switch 106 is opened to remove the energy supply from the heating resistor, and continued operation of switch 106 in this manner maintains constant the temperature level of the various elements within temperature control unit 44. Thus there is no distortion of the indications to voltage sensing stage 36 by reason of the temperature increases and decreases of the various components in this stage and connected to this stage. Instead, only the voltage at supply terminals 60 and 61, as coupled over conductors 63 and 64 to voltage sensing stage 36, determines the operation within this stage.

The input side of delay stage 34 includes a coupling transformer 110 which has a primary winding 111 coupled to two of the three phase conductors of generator 28. The lower terminal of secondary winding 112 of transformer 110 is connected directly to the lower input terminal of a bridge rectifier 113, including four rectifiers 114–117, and the upper terminal of secondary winding 112 is coupled over a resistor 118 to the upper input terminal of bridge 113. Each of rectifiers 114–117 includes an anode referenced by letter a and a cathode designated by letter b. One output point of bridge rectifier 113, at the junction of anodes 114a and 116a, is coupled over series-connected resistors 120 and 121 to positive conductor 64. A transistor switch 62 includes an emitter 62e, a base 62b, and a collector 62c; base 62b is connected to the junction of resistors 120 and 121. Connections are also made from the second output terminal over conductor 122 to negative supply terminal 60, and to emitter 62e of transistor switch 62.

When the output voltage level of generator 28 is low (as when the engine is at cranking speed), there is only a slight voltage potential appearing across the output terminals of rectifier bridge 13, and so only a negligible negative voltage is supplied to base 62b of transistor switch 62. Accordingly, with the positive bias applied from the junction of resistors 120 and 121 to base 62b, and the negative potential applied from terminal 60 to emitter 62e of the transistor, the emitter-base circuit of transistor switch 62 is forward-biassed and this transistor conducts. Collector current flows from 62c over conductor 81 and through common emitter resistor 80 to positive conductor 64, establishing a back-bias across emitter resistor 80 of a level sufficient to maintain transistor 70 non-conductive irrespective of the action of first transistor 68 in voltage sensing stage 36. Thus, delay stage 34 effectively disables voltage sensing stage 36, and may be said to apply a disabling signal to the control system to maintain such system inoperative until an output voltage of appreciable level appears at the output conductors of generator 28.

One purpose of delay stage 34 is to assure that the engine has reached a reasonable speed, for example, at least idling speed, before the load of the generator is added to the engine. Without a delay stage, the control system would operate as soon as starter motor 14 (FIGURE 1) was energized to drive engine 16. Thus the control system would be energized and pass current through field coil 30, placing a considerable counter torque on the drive system and causing slippage of the belts. Delay stage 34 not only obviates this difficulty, but also protects power switch stage 48 from drawing continuous current at a high level if the ignition key of the vehicle in which the control system is installed is turned on without cranking the engine to produce a usable generator output voltage. Such turning of the key might be accidental, or may occur in certain automotive systems in which the electrical system can be energized to operate equipment (i.e., radio, lights, etc.) even when the engine is not turning over.

As the engine is cranked and reaches idling speed, the generator output potential increases; the output voltage of one phase is applied across primary winding 111 of transformer 110 and the potential which appears across secondary winding 112 is rectified in bridge circuit 113. Resistor 118, connected in the secondary circuit of transformer 110, protects this circuit against excessive current flow under conditions of increasing generator output.

The polarity of the output voltage from rectifier bridge 113 is negative at the junction of anodes 114a and 116a;

this voltage is applied over resistor 120 to base 62b of transistor switch 62. As this voltage increases to a level sufficient to overcome the forward bias normally applied to the emitter-base circuit of the NPN-type transistor switch, transistor 62 is cut off and collector current ceases to flow, removing the high back-bias previously applied across common emitter resistor 80 of transistors 68 and 70 by reason of such current flow. With the removal of the high back-bias formerly contributed by the flow of collector current over conductor 81 and common emitter resistor 80, transistor 70 is conditioned for operation to the conductive state immediately upon cut off of transistor 68 by a decrease in the potential appearing at load terminals 60 and 61. As soon as second transistor 70 in voltage sensing stage 36 is conductive, the remaining transistors in the system 90—92, 100 and 102 become conductive and pass additional current through field coil 30, raising the energization level of generator 28 and increasing its output. Thus, before the output voltage of generator 28 is high enough to produce a sufficiently negative potential at the output of bridge rectifier 113 to cut off transistor switch 62, the only excitation for field coil 30 is the minimum current flow provided from supply conductor 64, over resistor 98, field coil 30, to supply conductor 63. Thus a large counter torque is not placed upon the drive system during the initial cranking of the engine. Those skilled in the art will recognize that an alternative to the electrical delay stage 34 is a system for automatically regulating the tension of drive belt 24 (FIGURE 1) to insure that the load represented by generator 28 is not placed upon the engine during acceleration.

In one embodiment of the invention, transistor switch 62 and its associated circuitry was selected to provide a "turn-on" voltage of +0.8 volt; that is, when the base-emitter voltage reached +0.8 volt, transistor 62 became conductive. This transistor switch became non-conductive at a "turn-off" voltage of +0.5 volt. When the engine was at cranking speed, the output level of generator 28 was set so that only about 0.3 volt was applied across primary winding 111 of transformer 112; accordingly, at this engine speed transistor 62 remains conductive and a disabling signal is applied over conductor 81 to prevent operation of the control system. When the engine attained idling speed, a signal of approximately 2 volts was applied to primary winding 111, which developed a negative voltage of sufficient level at the output terminals of rectifier bridge 113 to render transistor switch 62 non-conductive, removing the disabling signal from conductor 81 and resistor 80 and thus conditioning the control system for operation.

System Operation—Figure 2

As the ignition key (not shown) is turned, starter motor 14 (FIGURE 1) is energized and clutch 18 effects a driving connection between starter motor 14 and engine 16. At this time the requisite D.C. potential is applied from supply terminals 60 and 61 (FIGURE 2) to voltage sensing stage 36 of the invention, but the control system is still inoperative because the output voltage of generator 28 is still insufficient to cut off transistor switch 62 and remove the disabling signal from the control system. As the output of generator 28 increases, the potential applied to primary winding 111 of transformer 110 also increases, and the output voltage of bridge 113 increases to provide a biasing potential at base 62b, sufficient to cut off transistor 62, and this switch is turned off to discontinue application of the disabling signal to the control system. At this time, assuming that the supply potential at terminals 60 and 61 is slightly below 28 volts, there is insufficient potential applied at base 68b of transistor 68 to maintain this transistor conductive and so it is cut off. Accordingly the potential dropped across resistor 76 is decreased, causing the potential at base 70b of transistor 70 to go more negative, turning on transistor 70, and sequentially turning on each of the transistors in amplifier 46 as explained hereinbefore. Conduction of transistor 92, the last transistor in amplifier 46, develops a sufficient potential across bias resistor 101 in power switch 48 to turn on transistors 100 and 102. Transistors 100 and 102 thus conduct, translating current through field coil 30 and increasing the energization of generator 28 which instantly effects an increase in the supply potential at terminals 60 and 61. This potential increase likewise raises the bias potential across resistor 71, and transistor 68 is again turned on and each of the remaining transistor stages is cut off so that there is now only the minimum energization of field coil 30. As the voltage at terminals 60 and 61 varies, the control system is rapidly switched on and off and the energization of field coil 30 is simultaneously varied; this periodic energization of the field coil is depicted in the shaded areas of the pulse waveforms shown in FIGURES 3A, 3B and 3C.

When transistor 68 is cut off, transistors 70, 90, 91, 92, 100 and 102 conduct to supply power to field coil 30. The conduction of these six transistors is indicated by the shaded areas in FIGURES 3A–3C. In FIGURE 3A, with a low battery output voltage and a heavy generator load, the pulse duration is of a substantial period prior to the time at which the sensing unit turns off the control system. The pulse duration or on time of the system, measured as the current flow between emitter and collector of power transistors 100 and 102, was approximately 34 milliseconds, and the control system was cut off for approximately 8 milliseconds, whereby a series of relatively long duration pulses is produced by the control system. As noted hereinbefore, both the pulse length or on time of the system and the interval between pulses are dependent upon the battery output level and the load on the vehicle generator. Because the pulses are of a duration measured in milliseconds, for example only 34 milliseconds as shown in FIGURE 3A, many pulses are transmitted to field coil 30 during a single second and so the output voltage at terminals 60 and 61 is stabilized at what, for practical purposes, is a constant supply potential.

With a decrease in the load on the generator and a somewhat higher battery output voltage, the on time of the control system is reduced and the time interval between successive pulses or conductive periods of the system is similarly increased, as depicted in FIGURE 3B. Under the conditions there shown the system is conductive for an interval of approximately 17 milliseconds and is cut off for an interval of approximately 28 milliseconds. FIGURE 3C indicates the system operation when the battery output supplies practically the entire potential required at terminals 60 and 61 with a light load on the generator. The consecutive pulses or on times of the system there depicted are approximately 8 milliseconds and 5 milliseconds in length, with a duration of about 60 milliseconds between successsive pairs of pulses. No matter the particular pulse duration or repetition rate of the pulses indicating the conductive time of applicant's novel control system, the effect is to provide a substantially constant output potential at terminals 60 and 61 by reason of the modulation of the on time of the control system which supplies the variation of the energization of field coil 30 necessary to produce such a constant supply potential.

The control system is thus on continuously (transistors 100 and 102 fully saturated) as long as the voltage at terminals 60 and 61 is less than or equal to 27.8 volts, and is off continuously whenever the voltage at terminals 60 and 61 is equal to or greater than 28.0 volts. When saturated the power transistors dissipate approximately three watts, as contrasted to known gradually changing regulating systems wherein about 45 watts is dissipated.

Overload protection is provided by the generator itself because its field winding saturates at a certain current level, thereby limiting the current flow. This saturation level is sufficiently low to insure that the transistors are not driven into the runaway state.

In determining the efficiency of a voltage regulator including the novel control system, a voltage of 27.5 volts was applied to terminals 60 and 61, and a current of 15 amperes was passed through field coil 30. The power in field coil 30 was 375 watts, and the total power drain of the power stage was 438 watts; thus the efficiency was 86%.

It can be shown that, if field coil 30 were tapped at one or more points and the output circuits of transistors 91 and 92 were connected to such points, the power now lost in collector resistors 94 and 96 can be made an active part of the energy in field coil 30. Moreover, for applications requiring less field power, transistor 100 and balancing resistors 103 and 104 can be removed. The overall efficiency of a regulator thus modified can be increased to 95–97%, for the principal power losses in the illustrated embodiment occur in resistors 96, 103, and 104. Such a modified regulator could be enclosed within a smaller carrying case, for the thermal outputs of the major heat sources are either eliminated or reduced.

The switching speed of the transistors, especially in the power stage, is about 30 microseconds. When compared to the thermal response time of about 20 milliseconds, the thermal safety factor (about 700 times slower than the switching time) is manifest. There was no trace of voltage spikes or pulses during system tests, giving promise of long life expectancy for the invention.

*Summary*

The embodiment of the invention disclosed herein is an accurate and efficient control system for use in a voltage regulator to provide an accurate, well-regulated supply voltage. Such a regulator unit can be mounted in front of the radiator in a truck or other automotive vehicle, thus providing cooling of the control system components. Such cooling, in conjunction with the temperature control of the voltage regulator stage and associated components, provides for highly accurate operation of the system and effects regulation of a supply voltage within ±0.2 volt. This is a marked improvement over prior art systems, such as the carbon pile regulator system, which provides regulation within approximately ±1.5 volt. One reason for the substantial increase of sensitivity is the use of a reference voltage state (e.g., stage 42 in FIGURE 1) to provide a constant voltage drop, thus transferring substantially all of the source voltage deviations to the bases of the voltage sensing transistors. The transistors of the inventive control system are cycled, being switched on and off at a rate related to the deviation of the output voltage from a desired value, to supply the proper average power to the generator coil to stabilize the supply voltage. Because the transistors conduct only when the vehicle battery requires augmenting by increasing the energization of the generator, the life of the transistors in the system is extended. A delay stage can be incorporated as taught in conjunction with the preferred embodiment to insure that an additional load is not placed on the vehicle's engine by energizing the field coil of the generator before the engine has come up to speed. Those skilled in the art will recognize that a transistor switch such as that incorporated in the delay stage may replace the Schmitt trigger circuit of the voltage sensing stage.

Although a particular embodiment of the invention has been shown and described, it is manifest that alterations and modifications may be made therein, and it is intended in the appended claims to cover all such modifications and alterations as may fall within the true spirit and scope of the invention.

What is claimed is:

1. For use in a voltage regulator for a generator having an input circuit including a field coil and an output circuit coupled to a vehicle battery for augmenting the potential appearing at the battery terminals, the combination of a voltage sensing stage coupled across said battery terminals operative in response to minute deviations of the battery voltage from a desired value to provide output pulses to said field coil which vary in duty cycle and frequency with different variations of the voltage from said desired value; and control means connected between said voltage sensing stage and said field coil for regulating the energization level of the field coil in response to the presence and absence of said pulses, whereby the output voltage of said generator which augments said battery voltage is simultaneously adjusted to provide a regulated output potential at said battery terminals.

2. For use in a voltage regulator for a generator having an input circuit including a field coil and an output circuit coupled to a battery for augmenting the potential appearing at the battery terminals, the combination of a transistorized voltage sensing stage coupled to said battery terminals for providing a control signal in response to deviation of the battery voltage from a desired value; a reference voltage stage, coupled between said battery terminals and said voltage sensing stage, for producing a constant potential drop across said reference voltage stage whereby substantially the entire voltage deviation at said battery terminals is applied directly to said voltage sensing stage; and a transistorized power switching stage coupled between said voltage sensing stage and said field coil for regulating the energization level of the field coil in response to the presence and absence of said control signal, whereby the output voltage of said generator which augments said battery voltage is simultaneously adjusted to provide a regulated output potential at said battery terminals.

3. For use in a voltage regulator for a generator having an input circuit including a field coil and an output circuit coupled to a battery for augmenting the potential appearing at the battery terminals, the combination of a voltage sensing stage coupled to said battery terminals for providing a control signal in response to deviation of the battery voltage from a desired value; a delay stage coupled to said generator and to said voltage sensing stage operative to generate a disabling signal whenever the output voltage of said generator is below a preassigned level, and means for coupling the disabling signal to said voltage sensing stage to prevent the operation thereof; and control means connected between said voltage sensing stage and said field coil, for regulating the energization level of the field coil in response to the presence and absence of said control signal whenever the output voltage of said generator is at least equal to said preassigned level, to thereby adjust the output voltage of said generator which augments said battery voltage and thus provide a regulated output potential at said battery terminals.

4. For use in a voltage regulator for a generator having an input circuit including a field coil and an output circuit coupled to a battery for augmenting the potential appearing at the battery terminals, the combination of a transistorized voltage sensing stage coupled to said battery terminals for providing a control signal in response to deviation of the battery voltage from a desired value; a temperature control unit enclosing said voltage sensing stage and coupled to said battery terminals, for maintaining said voltage sensing stage at a substantially constant temperature; and a transistorized power switching stage, coupled between said voltage sensing stage and said field coil, for regulating the energization level of the field coil in response to the presence and absence of said control signal, to thereby adjust the output voltage of said generator which augments said battery voltage and thus provide a regulated output potential at said battery terminals.

5. For use in a voltage regulator for a generator having an input circuit including a field coil and an output circuit coupled to a battery for augmenting the potential appearing at the battery terminals, the combination of a voltage sensing stage including a first and a second transistor coupled in a trigger circuit to provide non-conduction of said second transistor when said first transistor is conductive and to provide conduction of said second transistor when said first transistor is non-conductive, and means coupling said first transistor to said battery terminals to effect non-conduction of said first transistor in response to decrease of the battery voltage below a predetermined value; and a transistorized power switching stage, coupled between the second transistor of said voltage sensing stage and said field coil, for supplying energy to said field coil in response to conduction of said second transistor, to thereby adjust the output voltage of said generator which augments said battery voltage and thus provide a regulated output potential at said battery terminals.

6. For use in a voltage regulator for a generator having an input circuit including a field coil and an output circuit coupled to a battery for augmenting the potential appearing at the battery terminals, the combination of a voltage sensing stage including a first and a second transistor coupled in a trigger circuit to provide non-conduction of said second transistor when said first transistor is conductive and to provide conduction of said second transistor when said first transistor is non-conductive; a reference voltage stage including a Zener diode coupled between said first transistor and said battery terminals, for producing a constant potential drop across said Zener diode and transferring substantially the entire voltage deviation at said battery terminals directly to said voltage sensing stage, and for effecting non-conduction of said first transistor and conduction of said second transistor in response to decrease of the battery voltage below a predetermined value; and a transistorized power switching stage, coupled between the second transistor of said voltage sensing stage and said field coil, for supplying energy to said field coil in response to conduction of said second transistor, to thereby adjust the output voltage of said generator which augments said battery voltage and thus provide a regulated output potential at said battery terminals.

7. For use in a voltage regulator for a generator having an input circuit including a field coil and an output circuit coupled to a battery for augmenting the potential appearing at the battery terminals, the combination of a voltage-sensing stage including a first and a second transistor, each having input, output, and common electrodes, coupled in a trigger circuit to provide non-conduction of said second transistor when said first transistor is conductive and to provide conduction of said second transistor when said first transistor is non-conductive; means for transferring substantially the entire voltage deviation appearing at said battery terminals to said voltage-sensing stage comprising a series circuit including a resistor coupled to one of said battery terminals, a reference voltage stage including a Zener diode coupled between said resistor and the other of said battery terminals, and means coupling the junction of said resistor and said reference voltage stage to the input electrode of said first transistor; and a transistorized power switching stage, coupled between the second transistor of said voltage sensing stage and said field coil, for supplying energy to said field coil in response to conduction of said second transistor, to thereby adjust the output voltage of said generator which augments said battery voltage and thus provide a regulated output potential at said battery terminals.

8. For use in a voltage regulator for a generator having an input circuit including a field coil and an output circuit coupled to a battery for augmenting the potential appearing at the battery terminals, the combination of a voltage sensing stage including a first and a second transistor coupled in a trigger circuit to provide non-conduction of said second transistor when said first transistor is conductive and to provide conduction of said second transistor when said first transistor is non-conductive, and means coupling said first transistor to said battery terminals to effect non-conduction of said first transistor in response to decrease of the battery voltage below a predetermined value; a delay stage including a transistor switch coupled to said voltage sensing stage to supply a disabling signal thereto, biasing means coupled to said transistor switch to effect conduction thereof and thus disable said voltage sensing stage, and rectifier means coupled between said generator and said transistor switch to effect cutoff of said transistor switch when the output level of said generator reaches a preassigned level and thus enable said voltage sensing stage; and a transistorized power switching stage, coupled between the second transistor of said voltage sensing stage and said field coil, for supplying energy to said field coil in response to conduction of said second transistor, to thereby adjust the output voltage of said generator which augments said battery voltage and thus provide a regulated output potential at said battery terminals.

9. For use in a voltage regulator for a generator having an input circuit including a field coil and an output circuit coupled to a battery for augmenting the potential appearing at the battery terminals, the combination of a voltage-sensing stage including a first and a second transistor, each of which comprises base, emitter, and collector electrodes, coupled in a trigger circuit including a common emitter resistor having one end thereof coupled to the emitter of each of said first and second transistors to provide a back-bias voltage for said second transistor responsive to conduction of said first transistor, and means coupling said first transistor to said battery terminals to effect non-conduction thereof and conduction of said second transistor in response to decrease of the battery voltage below a predetermined value; a delay stage including a transistor switch having input, output, and common electrodes, means coupling the output electrode of said transistor switch to said one end of said common emitter resistor to supply a back-bias voltage of a level sufficient to maintain said second transistor non-conductive irrespective of the operation of said first transistor, biasing means including a voltage divider arrangement coupled to the input electrode of said transistor switch to effect conduction thereof and thus maintain the disabling back-bias potential across said common emitter resistor, and means including a transformer and a rectifier bridge coupled between said generator and said transistor switch to effect cut-off of said transistor switch when the output level of said generator reaches a preassigned level and thus remove the disabling back-bias potential from said common emitter resistor to enable operation of said voltage-sensing stage; and a transistorized power switching stage, coupled between the second transistor of said voltage-sensing stage and said field coil, for supplying energy to said field coil in response to conduction of said second transistor, to thereby adjust the output voltage of said generator which augments said battery voltage and thus provide a regulated output potential at said battery terminals.

10. For use in a voltage regulator for a generator having an input circuit including a field coil and an output circuit coupled to a battery for augmenting the potential appearing at the battery terminals, the combination of a voltage sensing stage including a first and a second transistor coupled in a trigger circuit to provide non-conduction of said second transistor when said first transistor is conductive and to provide conduction of said second transistor when said first transistor is non-conductive, and means coupling said first transistor to said battery terminals to effect non-conduction of said first transistor in response to decrease of the battery voltage below a predetermined value; an amplifier stage including at least one transistor amplifier coupled to said second transistor to effect conduction of said transistor amplifier responsive to conduction of said second transistor; and a transistorized power switching stage, coupled between said amplifier stage and said field coil, for supplying energy to said field coil in response to conduction of said transistor amplifier, to thereby adjust the output voltage of said generator which augments said battery voltage and thus provide a regulated output potential at said battery terminals.

11. For use in a voltage regulator for a generator having an input circuit including a field coil and an output circuit coupled to a battery for augmenting the potential appearing at the battery terminals, the combination of a voltage-sensing stage including a first and a second transistor coupled in a trigger circuit to provide non-conduction of said second transistor when said first transistor is conductive and to provide conduction of said second transistor when said first transistor is non-conductive, and means coupling said first transistor to said battery terminals to effect non-conduction of said first transistor in response to decrease of the battery voltage below a predetermined value; and a power switching stage, including at least one transistor having an input circuit coupled to the second transistor of said voltage-sensing stage and an output circuit coupled to said field coil, for passing current through said field coil in response to conduction of said second transistor, to thereby adjust the output voltage of said generator which augments said battery voltage and thus provide a regulated output potential at said battery terminals.

12. For use in a voltage regulator for a generator having an input circuit including a field coil and an output circuit coupled to a battery for augmenting the potential appearing at the battery terminals, the combination of a voltage-sensing stage including a first and a second transistor coupled in a trigger circuit to provide non-conduction of said second transistor when said first transistor is conductive and to provide conduction of said second transistor when said first transistor is non-conductive, and means coupling said first transistor to said battery terminals to effect non-conduction of said first transistor in response to decrease of the battery voltage below a predetermined value; and a power switching stage, including a pair of parallel-connected transistors having an input circuit coupled to the second transistor of said voltage-sensing stage and a separate balancing resistor connected between the output circuit of each of said parallel-connected transistors and said field coil, for passing current through said field coil in response to conduction of said second transistor, to thereby adjust the output voltage of said generator which augments said battery voltage and thus provide a regulated output potential at said battery terminals.

13. For use in a voltage regulator for a generator having an input circuit including a field coil and an output circuit coupled to a battery for augmenting the potential appearing at the battery terminals, the combination of a voltage-sensing stage including a first and a second transistor coupled in a trigger circuit to provide non-conduction of said second transistor when said first transistor is conductive and to provide conduction of said second transistor when said first transistor is non-conductive, and means coupling said first transistor to said battery terminals to effect non-conduction of said first transistor in response to decrease of the battery voltage below a predetermined value; and a power switching stage, including a pair of parallel-connected transistors each having input, output, and common electrodes, means coupling each of said input electrodes to said second transistor in said voltage sensing stage to effect conduction of said parallel-connected transistors responsive to conduction of said second transistor, a first balancing resistor coupled between said field coil and the output electrode of one of said parallel-connected transistors, and a second balancing resistor coupled between said field coil and the output electrode of the other of said parallel-connected transistors, whereby conduction of said parallel-connected transistors effects current flow through said field coil, to thereby adjust the output voltage of said generator which augments said battery voltage and thus provide a regulated output potential at said battery terminals.

14. A control system according to claim 13 and further comprising: a back-bias diode coupled between a point of reference potential and the common electrode of each of the parallel-connected transistors in the power switching stage; and a clipper diode parallel-coupled with said field coil to prevent damage to the transistors in the power switching stage when the current through the field coil is rapidly cut off.

15. For use in a voltage regulator for a generator having an input circuit including a field coil and an output circuit coupled to a battery for augmenting the potential appearing at the battery terminals, the combination of a transistorized voltage sensing stage; a reference voltage stage coupled between said voltage-sensing stage and said battery terminals to transfer substantially the entire voltage deviations appearing at the battery terminals to said voltage-sensing stage; a transistorized amplifier stage coupled to said voltage-sensing stage; a transistorized power switching stage including an input circuit coupled to said amplifier stage and an output circuit coupled to said field coil, for passing current through said field coil to adjust the output voltage of said generator which augments said battery voltage and thus provide a regulated output potential at said battery terminals; and a delay stage, coupled between said generator and said voltage-sensing stage, operative to apply a disabling signal to said voltage sensing stage until the output voltage of said generator reaches a preassigned level.

References Cited in the file of this patent

UNITED STATES PATENTS

| 2,809,301 | Short | Oct. 8, 1957 |
| 2,892,143 | Sommer | June 23, 1959 |